United States Patent
Sakamoto et al.

(10) Patent No.: US 12,211,475 B2
(45) Date of Patent: Jan. 28, 2025

(54) ELONGATED SOUND ISOLATION DEVICES AND SYSTEMS

(71) Applicant: Toyota Motor Engineering & Manufacturing North America, Inc., Plano, TX (US)

(72) Inventors: Mizuki Sakamoto, Toyota (JP); Tomohiro Miwa, Toyota (JP); Reimi Emoto, Nagoya (JP); Xiaoshi Su, Ann Arbor, MI (US); Debasish Banerjee, Ann Arbor, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 235 days.

(21) Appl. No.: 17/897,485

(22) Filed: Aug. 29, 2022

(65) Prior Publication Data
US 2024/0071353 A1 Feb. 29, 2024

(51) Int. Cl.
*G10K 11/172* (2006.01)
*B60R 13/08* (2006.01)
(Continued)

(52) U.S. Cl.
CPC ........ *G10K 11/172* (2013.01); *B60R 13/0815* (2013.01); *G10K 11/162* (2013.01)

(58) Field of Classification Search
CPC ...... G10K 11/172; G10K 11/16; G10K 11/02; G10K 11/04; G10K 11/002; G10K 11/00;
(Continued)

(56) References Cited

U.S. PATENT DOCUMENTS 3,275,101 A * 9/1966 Davis, Jr. ................ E04C 2/044
181/285
3,712,413 A * 1/1973 Eckel .................... E04B 1/8404
181/295
(Continued)

FOREIGN PATENT DOCUMENTS

CN 106205590 A 12/2016
CN 116052625 A * 5/2023
(Continued)

OTHER PUBLICATIONS

Elliott A. S. et al., "Omnidirectional acoustic absorber with a porous core and a metamaterial matching layer". J. Appl. Phys. 115, 204902 (2014). https://usir.salford.ac.uk/id/eprint/34529/1/jap_2014.pdf, 15 pp.

(Continued)

*Primary Examiner* — Edgardo San Martin
(74) *Attorney, Agent, or Firm* — Christopher G. Darrow; Darrow Mustafa PC

(57) ABSTRACT

Systems and devices are disclosed herein for absorbing unwanted target sounds. In one example, an acoustic scatterer for absorbing a target sound includes a housing defining a plurality of channels having an open end and a terminal end. The terminal ends of the plurality of channels are separate from each other and extend along a length of the housing. The acoustic scatterer also includes one or more spacers subdividing the plurality of channels along the length of the housing. In another example, a system for absorbing a target sound includes a plurality of acoustic scatterers, each having a housing that defines a plurality of channels having an open end and a terminal end. The terminal ends of the plurality of channels are separate from each other and extend along a length of the housing. The (Continued)

plurality of acoustic scatterers are stacked on top of each other in a lengthwise direction.

16 Claims, 6 Drawing Sheets

(51) Int. Cl.
  *E04B 1/84* (2006.01)
  *G10K 11/02* (2006.01)
  *G10K 11/04* (2006.01)
  *G10K 11/162* (2006.01)
(58) Field of Classification Search
  CPC ... G10K 11/162; B60R 13/0815; B60R 13/08; E04B 1/84; E04B 2001/8428; E04B 2001/8414; E04B 2001/8438; E04B 2001/8476; E04B 2001/848; E04B 2001/849
  See application file for complete search history.

(56) References Cited

U.S. PATENT DOCUMENTS

| | | | |
|---|---|---|---|
| 5,035,298 A * | 7/1991 | Noxon | E04F 13/0867 |
| | | | 181/295 |
| 5,220,535 A * | 6/1993 | Brigham | G10K 11/172 |
| | | | 367/1 |
| 5,959,265 A * | 9/1999 | Van Ligten | G10K 11/172 |
| | | | 181/293 |
| 8,789,652 B2 * | 7/2014 | Swallowe | G10K 11/172 |
| | | | 181/295 |
| 9,378,721 B2 * | 6/2016 | Zalewski | G10K 11/172 |
| 9,607,600 B2 * | 3/2017 | Swallowe | G10K 11/172 |
| 9,697,817 B2 * | 7/2017 | Zalewski | G10K 11/172 |
| 9,765,516 B2 * | 9/2017 | Van Dinther | E04B 1/8209 |
| 10,255,900 B2 * | 4/2019 | DeGrandis | G10K 11/20 |
| 10,714,070 B1 * | 7/2020 | Su | G10K 11/175 |
| 11,415,556 B2 * | 8/2022 | Lee | G01N 29/2487 |
| 11,545,128 B2 * | 1/2023 | Su | G10K 11/162 |
| 11,776,522 B2 * | 10/2023 | Su | G10K 11/162 |
| | | | 181/286 |
| 2012/0152650 A1 * | 6/2012 | Swallowe | G10K 11/172 |
| | | | 29/896.2 |
| 2015/0122577 A1 * | 5/2015 | Zalewski | G10K 11/172 |
| | | | 181/290 |
| 2021/0142773 A1 | 5/2021 | Su et al. | |
| 2024/0067358 A1 * | 2/2024 | Sakamoto | B64F 1/26 |

FOREIGN PATENT DOCUMENTS

| | | | |
|---|---|---|---|
| KR | 100976058 B1 * | 8/2010 | |
| KR | 100986316 B1 * | 10/2010 | |
| KR | 101019296 B1 * | 3/2011 | |
| KR | 101246781 B1 * | 4/2013 | |
| KR | 101263702 B1 * | 5/2013 | |
| WO | WO-2011065670 A2 * | 6/2011 | ............ E01F 8/0005 |

OTHER PUBLICATIONS

Liang Z. et al., "Extreme acoustic metamaterial by coiling up space". Phys. Rev. Lett. 108, 114301 (2012). https://tinyurl.com/5cd5u6v9, pp. 1-4.

Cheng, Y. et al., "Ultra-sparse metasurface for high reflection of low frequency sound based on artificial Mie resonances", Nature Materials, . 14, 1013-1019 (2015).http://english.ioa.cas.cn/as/201509/W020150901625104407576.pdf, pp. 1-8.

Ghaffarivardavagh, R. et al., "Ultra-open acoustic metamaterial silencer based on Fano-like interface", Phys. Rev. B 99, 024302 (2019), pp. 1-10.

Lee, T., et al., "Ultrasparse acoustic absorbers enabling fluid flow and visible-light controls." Physical Review Applied 11, No. 2 (2019): 024022. https://tinyurl.com/d5s5jraz, pp. 1-13.

Long, H. et al., "Multiband quasi-perfect low-frequency sound absorber based on double-channel Mie resonator." Applied Physics Letters 112, No. 3 (2018): 033507. https://tinyurl.com/2p83s43d, pp. 1-5.

* cited by examiner

ELONGATED SOUND ISOLATION DEVICES AND SYSTEMS

TECHNICAL FIELD

The present disclosure generally relates to sound isolation systems and devices and, more particularly, to elongated sound isolation systems and devices.

BACKGROUND

The background description provided is to generally present the context of the disclosure. Work of the inventors, to the extent it may be described in this background section, and aspects of the description that may not otherwise qualify as prior art at the time of filing, are neither expressly nor impliedly admitted as prior art against the present technology.

Low-frequency noise has been a long-standing issue for passenger comfort. Vehicles can generate significant low-frequency noises. These low-frequency noises may emanate from various sources, such as the powertrain and tires of the vehicle, wind noise, and the like.

There are several different solutions for managing low-frequency noises, but many have drawbacks. For example, one solution requires the use of high reflection material. Structures made of high reflection material, such as doors, windows, and walls, can reflect noises away from an area. However, the reflected noises may cause noise pollution, and the performance of these types of systems is limited by the mass law.

Another solution requires the use of high absorption material. However, conventional porous sound-absorbing materials are only efficient for high frequency (greater than 1 kHz) noise reduction due to their high impedance nature. The sound transmission through porous materials is high if the material microstructure has a large porosity.

SUMMARY

This section generally summarizes the disclosure and is not a comprehensive disclosure of its full scope or all its features.

In one embodiment, an acoustic scatterer for absorbing a target sound includes a housing defining a plurality of channels having an open end and a terminal end. The terminal ends of the plurality of channels are separate from each other and extend along a length of the housing. The acoustic scatterer also includes one or more spacers subdividing the plurality of channels along the length of the housing.

In another embodiment, a system for absorbing a target sound includes a plurality of acoustic scatterers, each having a housing that defines a plurality of channels having an open end and a terminal end. The terminal ends of the plurality of channels are separate from each other and extend along a length of the housing. The plurality of acoustic scatterers are stacked on top of each other in a lengthwise direction.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale

DETAILED DESCRIPTION

Described herein are systems and devices for absorbing sound. The systems and devices generally include one or more acoustic scatterers with a housing that defines a plurality of channels with an open end in a terminal end. The terminal ends of the channels are separate from each other and extend along the length of the housing of the acoustic scatterer. It has been observed that acoustic scatterers are optimized when the sound to be absorbed by the acoustic scatterer is planar with respect to the acoustic scatterer. However, in reality, sound waves are not perfect plane waves, so the performance of acoustic scatterers may be reduced. If sound pressure is not uniform along the length of the acoustic scatterer, the soundwave may have complicated modes inside this acoustic scatterer, reducing the effectiveness of the acoustic scatterer.

In one example, a device includes one acoustic scatterer with a spacer that subdivides the plurality of channels along the length of the housing of the acoustic scatterer. Generally, the spacer is used to define the height of the plurality of channels based on the wavelength of a particular target sound to be absorbed. For example, the height of the plurality of channels is defined at least in part by the spacer to be approximately less than the wavelength of the sound to be absorbed and, in one particular example, may be approximately 0.6 of the wavelength of the sound to be absorbed.

In another example, the system includes multiple acoustic scatterers, as mentioned above. However, in this example, the multiple acoustic scatterers are stacked on top of one another and generally have a height based on the wavelength of a particular target sound to be absorbed. Like before, the height may be approximately less than the wavelength of the sound to be absorbed and, in one particular example, may be approximately 0.6 of the wavelength of the sound to be absorbed.

By utilizing a spacer or utilizing multiple acoustic scatterers mentioned in the paragraphs above, sound pressure acting on the scatterers can be made more uniform along the length of the acoustic scatterers. This generally reduces the complexity of the modes inside the acoustic scatterers, improving the performance of the acoustic scatterers.

Figure 1:
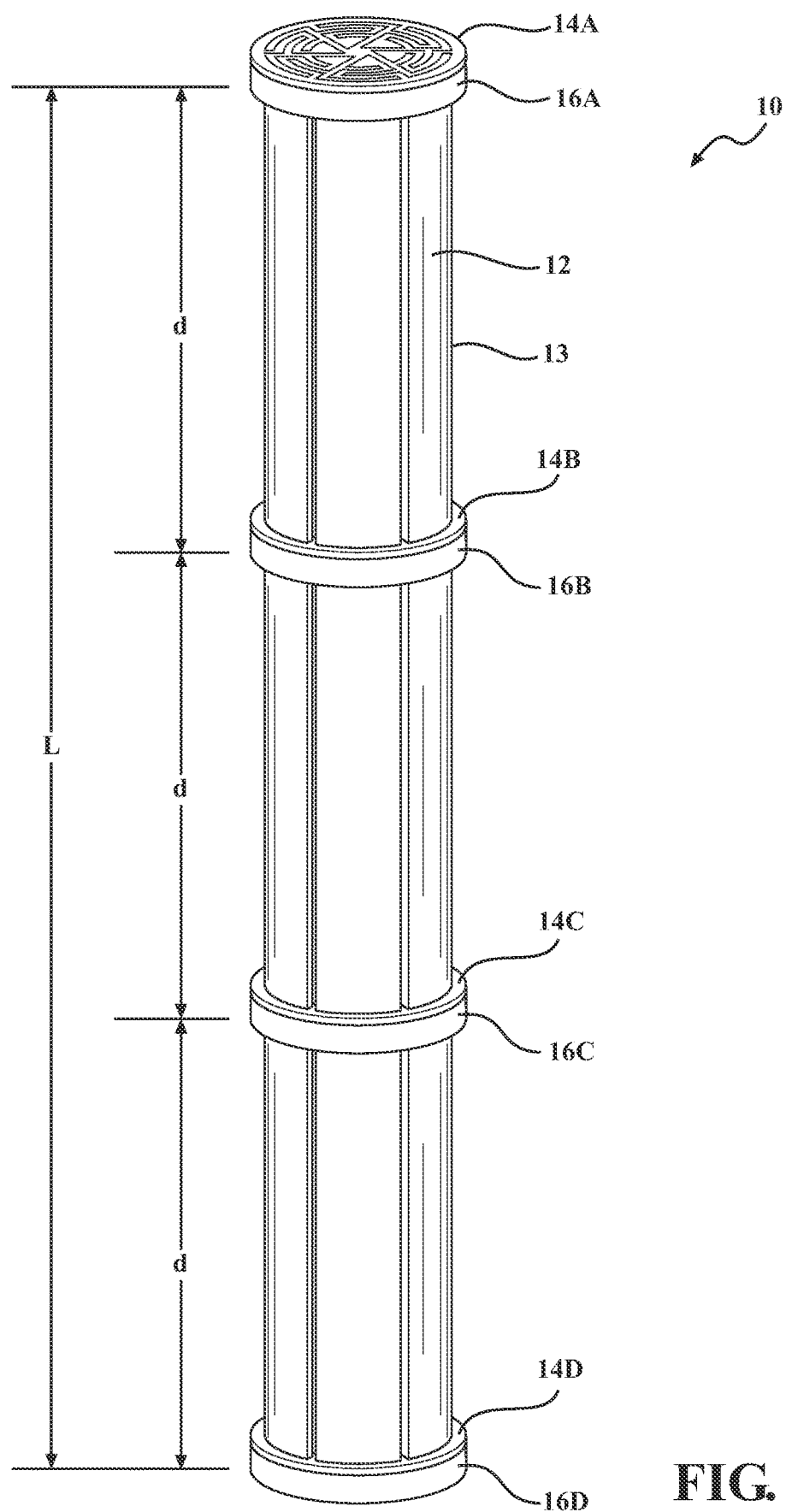
FIG. 1 illustrates one example of an elongated sound isolation device that utilizes one or more spacers to separate channels within the housing of an acoustic scatterer along the length of the acoustic scatterer.

Referring to FIG. 1, illustrated is a device 10 for absorbing sound. In this example, the device 10 includes an elongated acoustic scatterer 12. As will be described and shown later in this description, the acoustic scatterer 12 has a housing 13 that includes a plurality of channels that have an open end and a terminal end. Generally, the housing 13 of the elongated acoustic scatterer 12 is made of an acoustically hard material, such as metal, glass, plastic, ceramic, and the like In this example, the elongated acoustic scatterer 12 generally extends along the length L. As mentioned before, sound waves are not perfect plane waves, so the performance of acoustic scatterers, such as the elongated acoustic scatterer 12, may be reduced. If sound pressure is not uniform along the length of the elongated acoustic scatterer 12, the soundwave may have complicated modes inside the elongated acoustic scatterer 12, reducing the effectiveness of the elongated acoustic scatterer 12.

To improve the performance of the elongated acoustic scatterer 12, the device 10 includes one or more spacers 14A-14D generally placed along the length L of the elongated acoustic scatterer 12 and separated by the distance d. The spacers 14A-14D essentially subdivide the plurality of channels defined by the housing 13 along the length L. By so doing, sound waves interacting with the elongated acoustic scatterer 12 are more evenly distributed along portions of the elongated acoustic scatterer 12. The spacers 14A-14D may be held into place by retainers 16A-16D. Generally, the spacers 14A-14D are made of an acoustically hard material, such as metal, glass, plastic, ceramic, and the like. In one example, the housing 13 of the elongated acoustic scatterer 12 is made of the same material as the spacers 14A-14D The distance d of the subdivided plurality of channels defined by the spacers 14A-14D is based on the wavelength of the target sound to be absorbed. More specifically, the distance d is generally less than the wavelength of the target sound to be absorbed, such as between 0.4 and 0.8 of the wavelength of the sound to be absorbed. In one particular example, the distance d may be 0.6 of the wavelength of the sound to be absorbed.

Figure 2:
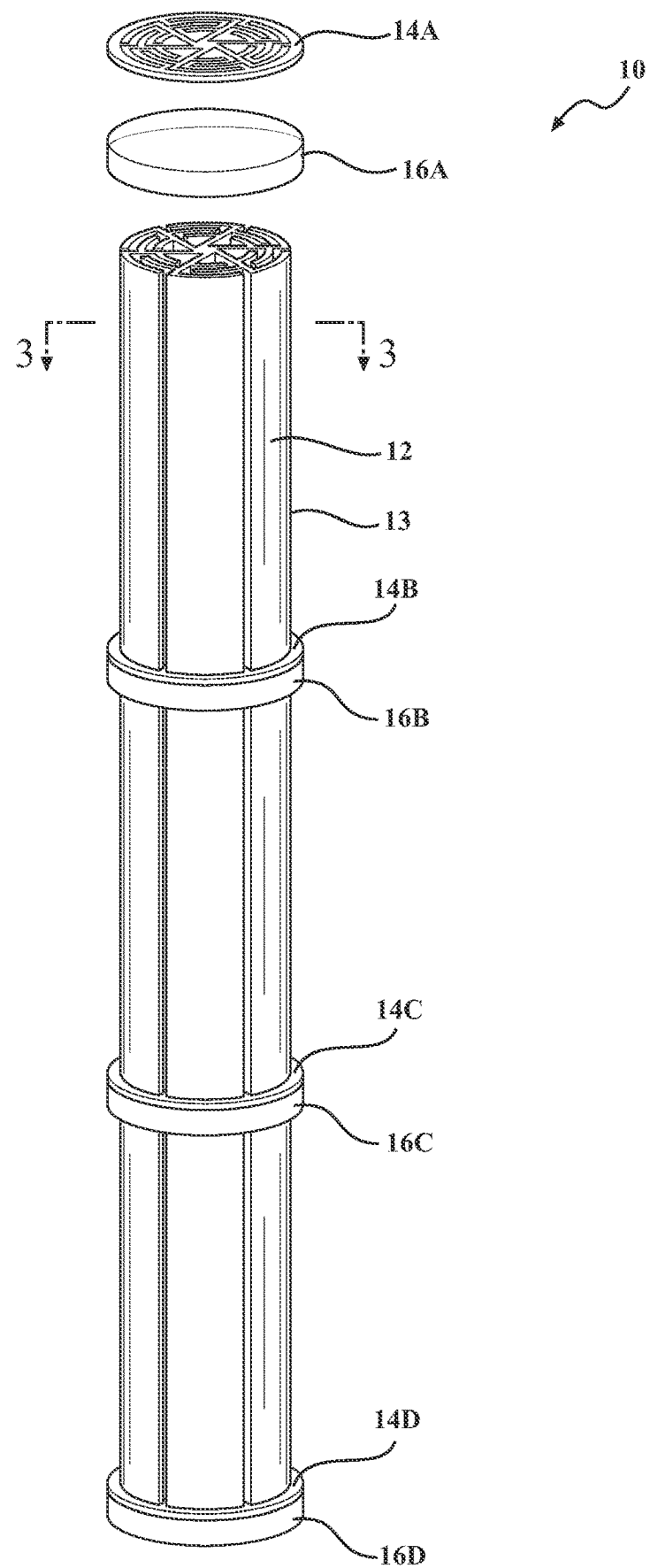
FIG. 2 illustrates a partially exploded view of the elongated sound isolation device of FIG. 1.

FIG. 2 illustrates a partially exploded view of the device 10 of FIG. 1. Here, the spacer 14A has portions that mate with portions of the housing 13 to subdivide the channels extending along the length L of the elongated acoustic scatterer 12. A retainer 16A can hold the spacer 14A in place along the length L of the elongated acoustic scatterer 12. The retainer 16A may be, in this example, a rubberized annular ring that can frictionally engage portions of the spacer 14A and portions of the housing 13 of the elongated acoustic scatterer 12 to hold the spacer 14A in place.

However, it should be understood that the spacers 14A-14D can be held in place by any one of a variety of different methods. For example, the spacers 14A-14D can be adhered to portions of the housing 13 of the elongated acoustic scatterer 12 using an adhesive or can be welded into place. Furthermore, the spacers 14A-14D, along with the housing 13, can be formed of a single unitary structure, removing any need for adhesives or other forms of retention.

Figure 3:
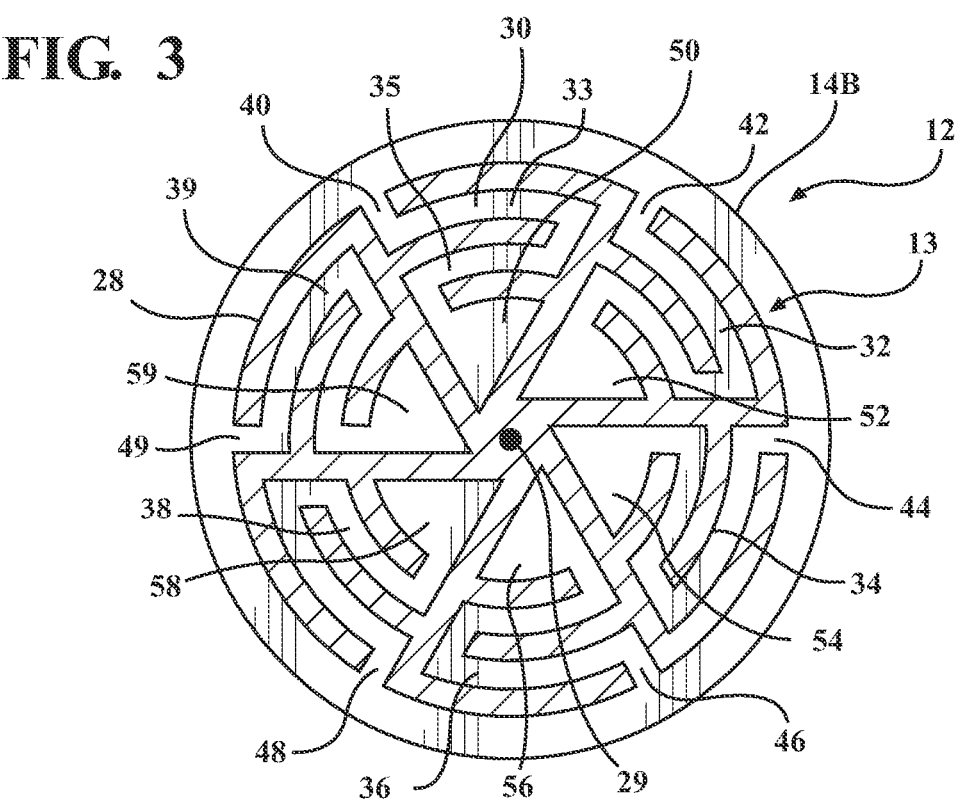
FIG. 3 illustrates a cutaway view, generally taken along lines 3-3 of FIG. 1, of the acoustic scatterer of the elongated sound isolation device.

Referring to FIG. 3, illustrated is a cutaway view, generally along lines 3-3 of FIG. 2 of the elongated acoustic scatterer 12. This example also shows the spacer 14B that essentially mates with channels defined by the housing 13 of the elongated acoustic scatterer 12. The elongated acoustic scatterer 12 may be similar to the acoustic scatterer(s) described in U.S. Pat. No. 10,714,070 and U.S. Pat. App. Pub. No. 2021/0142773, both to Su et al., the contents of both are herein incorporated by reference in their entirety.

In this example, the elongated acoustic scatterer 12 has a length L that generally extends in a direction perpendicular to a support surface. The length L can vary from application to application but is generally based on determinations regarding how and where sound should be absorbed. As mentioned before, the elongated acoustic scatterer 12 generally has a housing 13 that defines the overall shape of the elongated acoustic scatterer 12. Generally, the housing 13 may be symmetrical across the width of the housing 13. However, the housing 13 may take any one of a number of different shapes. As will be described later, the elongated acoustic scatterer 12 includes a plurality of channels.

The elongated acoustic scatterer 12 may have an acoustic monopole response and an acoustic dipole response. An acoustic monopole radiates sound waves in all directions. The radiation pattern of monopole generally has no angle dependence for both magnitude and phase of the sound pressure. The radiation of acoustic dipole has an angle dependence $e^{i\theta}$, where $\theta$ is the polar angle in 2D. The pressure fields have the same magnitude and the opposite phase at the same distance along the two opposite radiation directions. The monopole response is equivalent to the sound radiated from a pulsating cylinder whose radius expands and contracts sinusoidally. The dipole response is equivalent to the sound radiated from two pulsating cylinders separated from each other by a small distance, the two pulsating cylinders radiate sound with the same strength but opposite phase. The acoustic dipole response and the acoustic monopole response of the elongated acoustic scatterer 12 may have substantially similar resonant frequencies. The term "substantially similar" regarding resonant frequencies should be understood to mean that the resonant frequencies may differ by approximately 10% or less. Generally, the resonant frequencies chosen are based on the sound frequency to be absorbed.

The elongated acoustic scatterer 12 may have a plurality of channels. For example, the elongated acoustic scatterer 12 has six channels 30, 32, 34, 36, 38, and 39. However, it should be understood that any one of a number of channels may be utilized in elongated acoustic scatterer 12. Each of the six channels 30, 32, 34, 36, 38, and 39, have an open end 40, 42, 44, 46, 48, and 49, respectively, located adjacent to the outer perimeter 28. In addition, each of the six channels 30, 32, 34, 36, 38, and 39 have terminal ends 50, 52, 54, 56, 58, and 59, respectively. The terminal ends 50, 52, 54, 56, 58, and 59 may be located near a center 29 of the elongated acoustic scatterer 12. The terminal ends 50, 52, 54, 56, 58, and 59 may be separate from each other and may not be in fluid communication with each other.

The volumes of the channels 30, 32, 34, 36, 38, and 39 may be substantially equal to each other. Additionally, the overall shape of the channels 30, 32, 34, 36, 38, and 39 across the width of the elongated acoustic scatterer 12 may be substantially similar in shape and/or design.

Regarding the design of the channels 30, 32, 34, 36, 38, and 39, the channels may have a general zigzag type form. For example, with regard to the channel 30, the channel may have a zigzag, wherein one portion 33 of the channel 30 runs partially or substantially parallel to another portion 35 of the channel 30. However, it should be understood that the design of the channel may vary greatly and may not necessarily be a zigzag type design.

The channels 30, 32, 34, 36, 38, and 39 generally extend upward and downward along the length L of the elongated acoustic scatterer 12. However, these channels 30, 32, 34, 36, 38, and 39 are subdivided along the length by the spacers 14A-14D, such that these channels 30, 32, 34, 36, 38, and 39 are subdivided along the length. As such, each of the channels 30, 32, 34, 36, 38, and 39 extend along the length L of the elongated acoustic scatterer 12 for the distance d. As mentioned before, the distance d is based upon the wavelength of the sound to be absorbed. The distance d, in one example, may be approximately 0.6 of the wavelength of the sound to be absorbed, but can vary from application to application.

Figure 4:
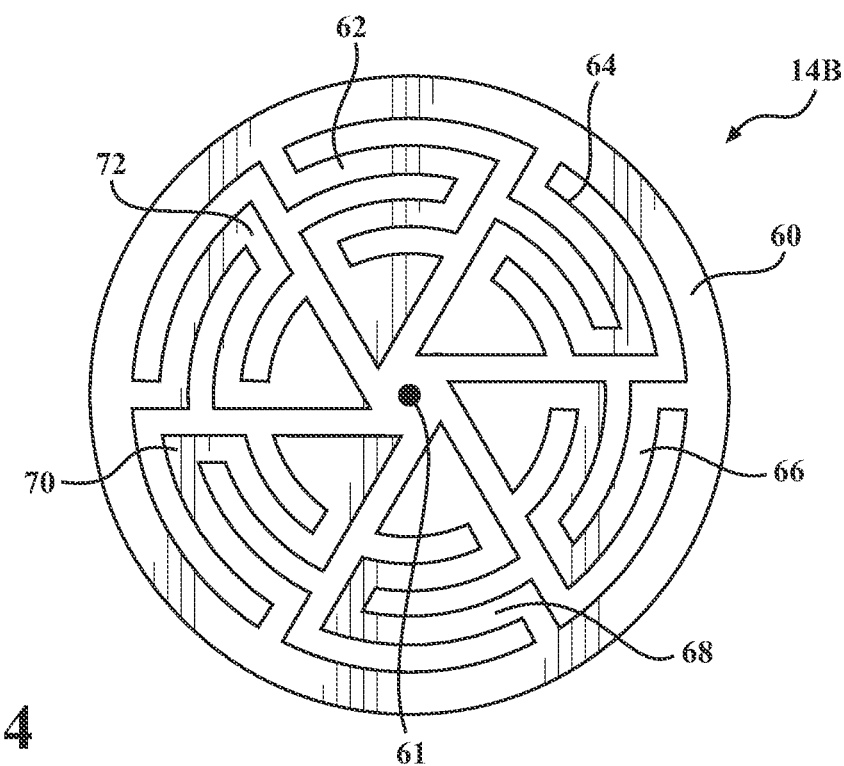
FIG. 4 illustrates a more detailed view of a spacer used to separate channels within the housing of the sound isolation device of FIG. 1.

FIG. 4 illustrates a more detailed view of the spacer 14B, which may be similar to the spacers 14A, 14C, and 14D. As such, any description regarding the spacer 14B is equal equivalent to the spacers 14A, 14C, and 14D. Here, the spacer 14B generally includes an outer perimeter 60 that extends around the outer circumference of the spacer 14B. Extending from the outer perimeter 60 towards the center 61 of the spacer 14B are six extensions 62, 64, 66, 68, 70, and 72. The six extensions 62, 64, 66, 68, 70, and 72 are sized and shaped to mate with the channels 30, 32, 34, 36, 38, and 39, defined by the housing 13 of the elongated acoustic scatterer 12. For example, if the channels 30, 32, 34, 36, 38, and 39 are zigzag channels, such as shown, the extensions 62, 64, 66, 68, 70, and 72 will have a zigzag shape as well. As such, the six extensions 62, 64, 66, 68, 70, and 72 essentially subdivide the channels 30, 32, 34, 36, 38, and 39 along the length L of the elongated acoustic scatterer 12.

The device 10 can be manufactured in a number of different ways. However, in this example, the device 10 is manufactured by first making the elongated acoustic scatterers 12. The elongated acoustic scatterer 12 can be made by a number different processes, such as 3D printing, extrusion, casting, and the like. In one particular example, the elongated acoustic scatterer 12 is extruded, where material is pressed through a die. Again, other manufacturing techniques can be utilized as well, such as casting and 3D printing.

Once the elongated acoustic scatterer 12 is made, the spacers 14A-14D are manufactured. Like the elongated acoustic scatterer 12, spacers 14A-14D can be made through various processes, such as extrusion, casting, 3D printing, and the like. Once the spacers 14A-14D are made, they can be fitted onto the elongated acoustic scatterer 12 by sliding the spacers 14A-14D along the length of the elongated acoustic scatterer 12 to an appropriate position. Once the spacers 14A-14D are appropriately positioned, the retainer is 16A-16D can then be utilized to hold the spacers 14A-14D in place.

Figure 5:
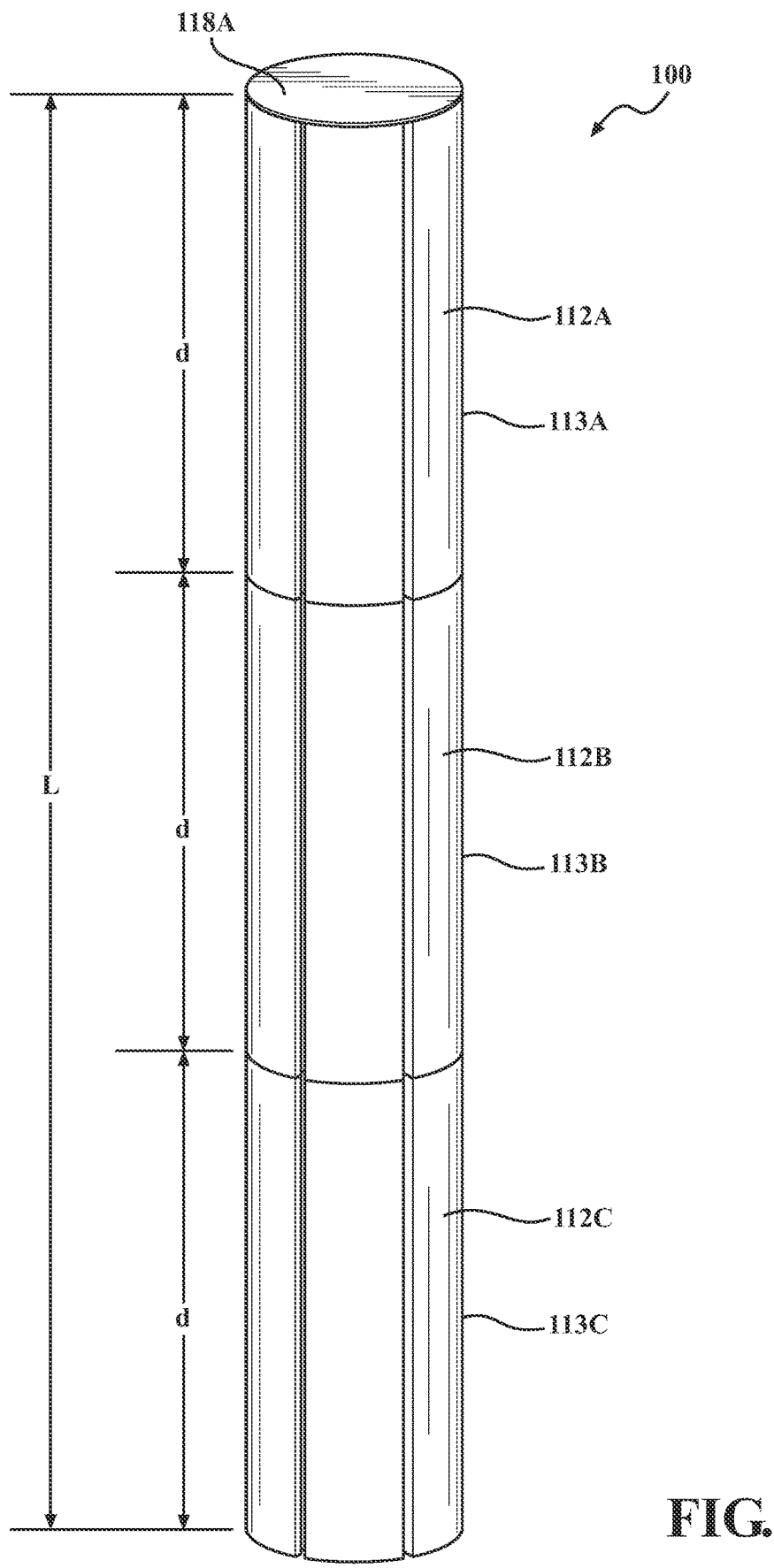
FIG. 5 illustrates an example of an elongated sound isolation system that utilizes a plurality of acoustic scatterers stacked on top of each other.

However, instead of subdividing the channels 30, 32, 34, 36, 38, and 39 along the length L of the elongated acoustic scatterer 12 to improve the performance of the elongated acoustic scatterer 12 using spacers 14A-14D, multiple acoustic scatterers that are stacked on top of each other could also be utilized as well. For example, FIG. 5 illustrates a system 100 for absorbing sound that utilizes multiple acoustic scatterers 112A-112C stacked on top of one another. In this example, the system 100 includes three acoustic scatterers 112A-112C, but it should be understood that the system 100 can include any number of acoustic scatterers that are stacked on top of one another. The acoustic scatterers 112A-112C shall extend along a length L to define an elongated acoustic scatterer. The length of each acoustic scatterer 112A-112C may have a distance d, similar to the distance d mentioned in the previous example. Moreover, the distance D representing the length of each of the acoustic scatterers 112A-112C is based upon the wavelength of the sound to be absorbed. The distance d, in one example, may be approximately 0.6 of the wavelength of the sound to be absorbed, but can vary from application to application. Generally, the distance d is less than the wavelength of the sound to be absorbed.

In particular, the multiple acoustic scatterers 112A-112C may be manufactured using a number of different processes, such as extrusion, casting, 3D printing, and the like. The process utilized to make the multiple acoustic scatterers 112A-112C may be similar to the process utilized to make the elongated acoustic scatterer 12. Once the multiple acoustic scatterers 112A-112C are made, each side of the multiple acoustic scatterers 112A-112C may be capped utilizing the caps 118A-118C and 120A-120C. The caps 118A-118C may be utilized to enclose one end of the multiple acoustic scatterers 112A-112C, while the caps 120A-120C may be utilized to enclose the other end of the multiple acoustic scatterers 112A-112C. In some cases, only a single cap may be utilized when the cap is located between two acoustic scatterers, such as between the acoustic scatterers 112A and 112B and/or the acoustic scatterers 112B and 112C.

Once the multiple acoustic scatterers, the multiple acoustic scatterers 112A-112C have different ends that are appropriately capped, the multiple acoustic scatterers may be stacked on top of each other in a lengthwise manner, as shown in FIG. 5. In addition to stacking, the multiple acoustic scatterers 112A-112C may be attached to each other by utilizing adhesives or other acceptable methodologies.

Figure 6:
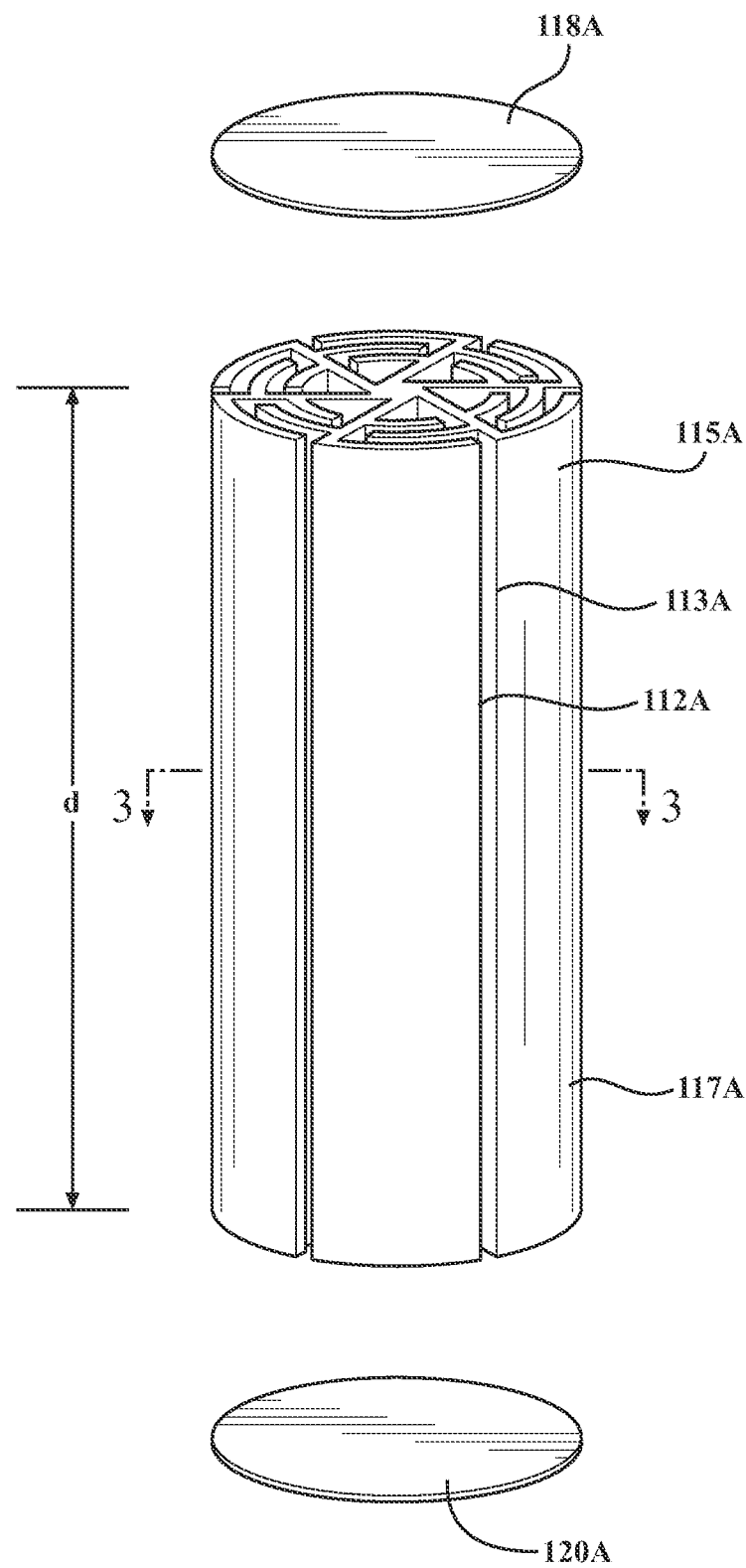
FIG. 6 illustrates an exploded view of one of the acoustic scatterers of FIG. 5.

Referring to FIG. 6, illustrated is an exploded view of one of the acoustic scatterers 112A of the system 100 of FIG. 5. Generally, the acoustic scatterer 112A is substantially similar to the other acoustic scatterers 112B and 112C. Therefore, any description regarding the acoustic scatterer 112A is equally applicable to the other acoustic scatterers 112B and 112C. In this example, the acoustic scatterer 112A includes a housing 113A that defines one or more channels. The acoustic scatterer 112A may have a top 115A and a bottom 117A that are located at opposing ends of the acoustic scatterer 112A. The top 115A may be enclosed by a top cap 118A, while the bottom 117A may be enclosed by a bottom cap 120A. The top cap 118A and/or bottom cap 120A essentially enclose portions of the acoustic scatterer 112A so that when the acoustic scatterer 112A is stacked on top of another acoustic scatterer, such as shown in FIG. 5, the channels defined by the housing 113A of the acoustic scatterer 112A are not connected lengthwise to another channel defined by another housing of another acoustic scatterer. By utilizing the top cap 118A and/or bottom cap 120A, sound waves interacting with the acoustic scatterer 112A are more evenly distributed along portions of the acoustic scatterer 112A.

The top cap 118A and/or bottom cap 120A may be sized and shaped to substantially match the size and shape of the top 115A and/or the bottom 117A to enclose the channels defined by the housing 113A in the lengthwise direction. In one example, the top cap 118A and/or bottom cap 120A may be circular and completely filled in. In other examples, the top cap 118A and/or bottom cap 120A may be similar to the spacers 14A-14D and may have portions that mate with portions of the channel defined by the housing 113A distance enclose the top 115A and/or the bottom 117A of the acoustic scatterer 112A.

Figure 7:
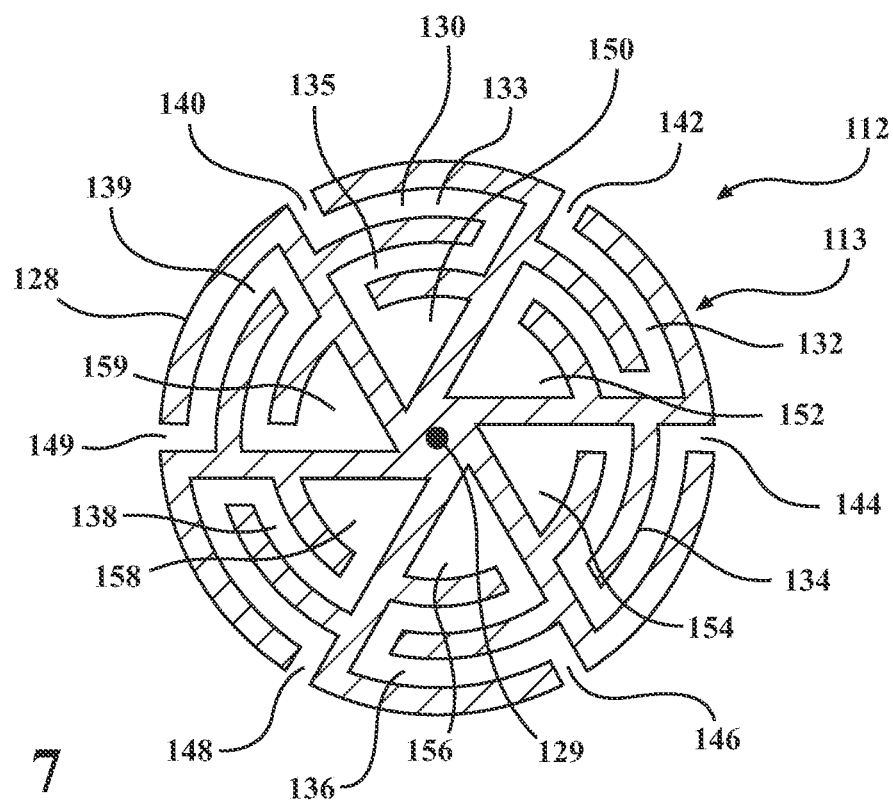
FIG. 7 illustrates a cutaway view, generally taken along lines 7-7 of FIG. 6, of one of the acoustic scatterers making up the elongated sound isolation system.

The acoustic scatterer 112A is generally similar to the elongated acoustic scatterer 12 described previously but differs in that it is shorter. As such, the channels defined within the acoustic scatterer 112A may be similar to those defined within the elongated acoustic scatterer 12. FIG. 7 illustrates a cutaway view, generally along lines 7-7, of the acoustic scatterer 112A. As shown in the cutaway view FIG. 7, the acoustic scatterer 112A is somewhat similar to the elongated acoustic scatterer 12.

Moreover, like the elongated acoustic scatterer 12, the acoustic scatterer 112A may have a plurality of channels. In this example, the acoustic scatterer 112A has six channels 130, 132, 134, 136, 138, and 139. However, it should be understood that any one of a number of channels may be utilized in elongated acoustic scatterer 12. Each of the six channels 130, 132, 134, 136, 138, and 139 have an open end 140, 142, 144, 146, 148, and 149, respectively, located adjacent to the outer perimeter 128. In addition, each of the six channels 130, 132, 134, 136, 138, and 139 have terminal ends 150, 152, 154, 156, 158, and 159, respectively. The terminal ends 150, 152, 154, 156, 158, and 159 may be located near a center 129 of the acoustic scatterer 112A. The terminal ends 150, 152, 154, 156, 158, and 159 may be separate from each other and may not be in fluid communication with each other.

The volumes of the channels 130, 132, 134, 136, 138, and 139 may be substantially equal to each other. Additionally, the overall shape of the channels 130, 132, 134, 136, 138, and 139 across the width of the acoustic scatterer 112A may be substantially similar in shape and/or design. Regarding the design of the channels 130, 132, 134, 136, 138, and 139, the channels may have a general zigzag type of form. For example, with regard to the channel 130, the channel may have a zigzag, wherein one portion 133 of the channel 130 runs partially or substantially parallel to another portion 135 of the channel 130. However, it should be understood that the design of the channel may vary greatly and may not necessarily be a zigzag type design.

By utilizing spacers as done in the device 10 or utilizing multiple acoustic scatterers as done in the system 100, sound pressure acting on the scatterers can be made more uniform along the length of the acoustic scatterers. This generally reduces the complexity of the modes inside the acoustic scatterers, improving the performance of the acoustic scatterers.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for the general organization of topics within the present disclosure and are not intended to limit the disclosure of the technology or any aspect thereof. The recitation of multiple embodiments having stated features is not intended to exclude other embodiments having additional features or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in various forms. Therefore, while this disclosure includes particular examples, the true scope of the disclosure should not be so limited since other modifications will become apparent to the skilled practitioner upon a study of the specification and the following claims. Reference herein to one aspect or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should also be understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. An acoustic scatterer for absorbing a target sound comprising:
    a housing defining a plurality of channels having an open end and a terminal end, the terminal ends of the plurality of channels being separate from each other and extending along a length of the housing; and
    at least one spacer subdividing the plurality of channels along the length of the housing that defines a height of the plurality of channels along the length of the housing, the height of the plurality of channels being approximately 0.4 to 0.8 of the wavelength of the target sound.

2. The acoustic scatterer of claim 1, wherein the height of each of the plurality of channels is approximately 0.6 of the wavelength of the target sound.

3. The acoustic scatterer of claim 1, wherein resonant frequencies of the plurality of channels is substantially equal to a frequency of the target sound.

4. The acoustic scatterer of claim 1, wherein a cross-section along a width of the acoustic scatterer defines a symmetrical shape having at least one line of symmetry, the symmetrical shape having an outer surface, wherein the open end of the plurality of channels are adjacent to the outer surface.

5. The acoustic scatterer of claim 1, wherein each channel of the plurality of channels have a substantially similar volume.

6. The acoustic scatterer of claim 1, wherein each channel of the plurality of channels have a substantially similar shape across a width of the acoustic scatterer.

7. The acoustic scatterer of claim 1, wherein the housing is made of a unitary structure, and the spacer is made of a separate structure.

8. The acoustic scatterer of claim 7, wherein the spacer includes:
   an outer perimeter; and
   a plurality of extensions that extend from the outer perimeter towards a center of the spacer, the plurality of extensions having a shape based on a shape of the plurality of channels.

9. The acoustic scatterer of claim 8, wherein the outer perimeter of the spacer is adjacent to an outer surface of the housing.

10. The acoustic scatterer of claim 9, further comprising a retainer directly adjacent to the outer perimeter of the spacer and the outer surface of the housing, the retainer being configured to hold the spacer in place with respect to the housing.

11. A system for absorbing a target sound comprising:
   a plurality of acoustic scatterers, each having a housing that defines a plurality of channels having an open end and a terminal end, the terminal ends of the plurality of channels being separate from each other and extending along a length of the housing, the plurality of acoustic scatterers having a height that extends along the length of the housing;
   the plurality of acoustic scatterers are stacked on top of each other in a lengthwise direction;
   the height of the plurality of acoustic channels of each of the plurality of acoustic scatterers is approximately 0.4 to 0.8 of the wavelength of the target sound;
   the open end of each of the plurality of acoustic scatterers extends along the lengths of each of the plurality of acoustic scatterers; and
   the open end of each of the plurality of acoustic scatterers are aligned with each other in the lengthwise direction.

12. The system of claim 11, wherein the height of the plurality of acoustic channels of each of the plurality of acoustic scatterers is approximately 0.6 of the wavelength of the target sound.

13. The system of claim 11, wherein resonant frequencies of the plurality of channels is substantially equal to a frequency of the target sound.

14. The system of claim 11, wherein a cross-section along a width of one of the plurality of acoustic scatterers defines a symmetrical shape having at least one line of symmetry, the symmetrical shape having an outer surface, wherein the open end of the plurality of channels are adjacent to the outer surface.

15. The system of claim 11, wherein each channel of the plurality of channels have a substantially similar volume.

16. The system of claim 11, wherein each channel of the plurality of channels have a substantially similar shape across a width of one of the plurality of acoustic scatterers.

* * * * *